United States Patent [19]
McCormack et al.

[11] Patent Number: 5,216,439
[45] Date of Patent: Jun. 1, 1993

[54] SCALING SYSTEMS FOR DATA RECORDERS

[75] Inventors: Robert B. McCormack, Mission Viejo; Alfred S. Krause, Glendora, both of Calif.

[73] Assignee: Graphtec Kabushiki Kaisha, Tokyo, Japan

[21] Appl. No.: 600,436

[22] Filed: Oct. 19, 1990

[51] Int. Cl.$^5$ ............................................. B41J 2/385
[52] U.S. Cl. ....................................... 346/65; 346/1.1; 346/76 PH; 346/140 R
[58] Field of Search .............. 346/65, 1.1, 66, 33 ME, 346/76 PH, 140 R; 364/520, 571.01–571.08; 324/113, 114, 115

[56] References Cited

U.S. PATENT DOCUMENTS

| | | | |
|---|---|---|---|
| 4,074,272 | 2/1978 | Way et al. | 346/33 A |
| 4,246,640 | 1/1981 | Babil et al. | 364/520 |
| 4,249,186 | 2/1981 | Edwards | 346/35 |
| 4,603,396 | 7/1986 | Washizuka et al. | 364/520 |
| 4,853,714 | 8/1989 | Niemeyer | 346/139 R |
| 4,862,387 | 8/1989 | Lee | 364/520 |
| 4,928,117 | 5/1990 | Takeuchi | 346/76 PH |
| 5,019,838 | 5/1991 | McKinley et al. | 346/121 |

Primary Examiner—Benjamin R. Fuller
Assistant Examiner—N. Le
Attorney, Agent, or Firm—Benoit Law Corporation

[57] ABSTRACT

Data is recorded with a plurality of clocked recording elements in a plurality of recordings in a plurality of different scales determined by different data recording parameters. Data recording parameters for any scale are electronically fixed for each recording in that scale, and are stored in a lookup table. Such stored data recording parameters are derived from that lookup table for determining the clocked recording elements for data recording in the particular scale, and data is recorded with such determined clocked recording elements in that scale.

12 Claims, 6 Drawing Sheets

SCALING SYSTEMS FOR DATA RECORDERS

BACKGROUND OF THE INVENTION

1. Field of the Invention

The subject invention relates to data recorders, including recorders having a plurality of clocked recording elements, and to automatic scaling systems for such recorders.

2. Information Disclosure Statement

A thermal printer with in-memory scan-line composition by K. J. Markson, et al, has been disclosed in the IBM Technical Disclosure Bulletin, Vol. 22, No. 5 (October, 1979), p 2022. A chart recorder having multiple thermal print heads has been disclosed in U.S. Pat. No. 4,739,344, by Sullivan et al. A chart recorder with a fundamentally different print head suspension system has been disclosed in U.S. Pat. No. 4,912,483, by Isamu Aizawa, issued Mar. 27, 1990.

A printout density control for thermal recorders has been disclosed in U.S. Pat. No. 4,928,117, by Toshiyuki Takeuchi, issued May 22, 1990. A reference line setting system for grid pattern recorders has been disclosed in U.S. Pat. No. 4,916,462 by Toshiyuki Takeuchi and Alfred Steven Krause, issued Apr. 10, 1990. These Aizawa, Takeuchi and Krause patents are herewith incorporated by reference herein and their disclosed circuits may be employed in the practice of the subject invention.

Attainable recording speed has been limited where data are recorded in different recording cycles with a multitude of clocked recording elements variably identifiable by different data recording parameters. By way of example, graphic printing of analog data in real time on a thermal array recorder requires that up to eight or more analog signals have to be digitized, scaled and printed once every print cycle, which require numerous calculations in a very small amount of time. The problem was particularly severe when printout of data at different scales was desired. Only minimal data scaling was possible, and such capability was fixed in the firmware and could not be altered during normal operation. With conventional hardware, real time data scaling was not possible. Also, conventional printers or data recorders needed to be able to read in an analog signal as a reference and adjust the print or recording scaling routines with this reference so that future signal input would be scaled relative to it.

SUMMARY OF THE INVENTION

It is a general object of this invention to overcome the disadvantages and to meet the needs expressed or implicit in the Information Disclosure Statement or in other parts hereof.

It is a germane object of this invention to provide improved recording methods and apparatus.

It is a related object of this invention to provide improved methods and apparatus for recording data in different scales.

It is also an object of this invention to provide improved methods and apparatus for recording data in different recording cycles.

It is a related object of this invention to provide automatic system calibration for data recording systems.

Other objects of the invention will become apparent in the further course of this disclosure.

The invention resides in a method of recording data with a plurality of clocked recording elements in a plurality of recordings in a plurality of different scales determined by different data recording parameters, comprising in combination the steps of providing an electronic lookup table, electronically fixing for each recording in a different scale the data recording parameters for that scale, storing such electronically fixed data recording parameters in the lookup table, deriving such fixed stored data recording parameters from that lookup table for determining the clocked recording elements for data recording in that scale, and recording data with such determined clocked recording elements in that scale.

The invention similarly resides in a method of recording data in a plurality of recordings in a plurality of different recording cycles with a plurality of clocked recording elements variably identifiable by different data recording parameters, comprising in combination the steps of providing an electronic lookup table, electronically fixing for each different recording cycle the data recording parameters for that cycle, storing such electronically fixed data recording parameters in the lookup table, deriving such fixed stored data recording parameters from that lookup table for determining the clocked recording elements for data recording in that cycle, and recording data with such determined clocked recording elements in that cycle.

The invention resides also in apparatus for recording data with a plurality of clocked recording elements in a plurality of recordings in a plurality of different scales determined by different data recording parameters, comprising in combination, an electronic lookup table, a micro-processor including means for electronically fixing for each recording in a different scale the data recording parameters for that scale, means for storing such electronically fixed data recording parameters in the lookup table and means for deriving such fixed stored data recording parameters from that lookup table for determining the clocked recording elements for data recording in that scale, and means connected to the micro-processor for recording data with such determined clocked recording elements in that scale.

In these embodiments, the data recording parameters are electronically fixed for storage in the lookup table according to the equation $$\text{table}(n) = GMIN + \frac{(n - AMIN) \times (GMAX - GMIN)}{AMAX - AMIN}$$

wherein table(n) is a recording element address to be stored at a particular table index of the lookup table, and n is that index, AMIN is a minimum recording amplitude and AMAX is a maximum recording amplitude set for the recording, and GMIN is a minimum scale limit and GMAX is a maximum scale limit for the recording.

A further embodiment of the invention sets a minimum recording amplitude, AMIN, a maximum recording amplitude, AMAX, a minimum scale limit, GMIN, and a maximum scale limit GMAX for data recording in a first scale or cycle, effects the fixing of data recording parameters for that first scale or cycle pursuant to that set AMIN, AMAX, GMIN and GMAX, stores in that lookup table the fixed data recording parameters for the first scale or cycle, derives from the lookup table the fixed stored data recording parameters for the first scale or cycle, and records data with the derived fixed data recording parameters for and in that first scale or cycle. This may be repeated in and for a second scale or cycle, and so forth.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which.

DESCRIPTION OF PREFERRED EMBODIMENTS

Figure 1:
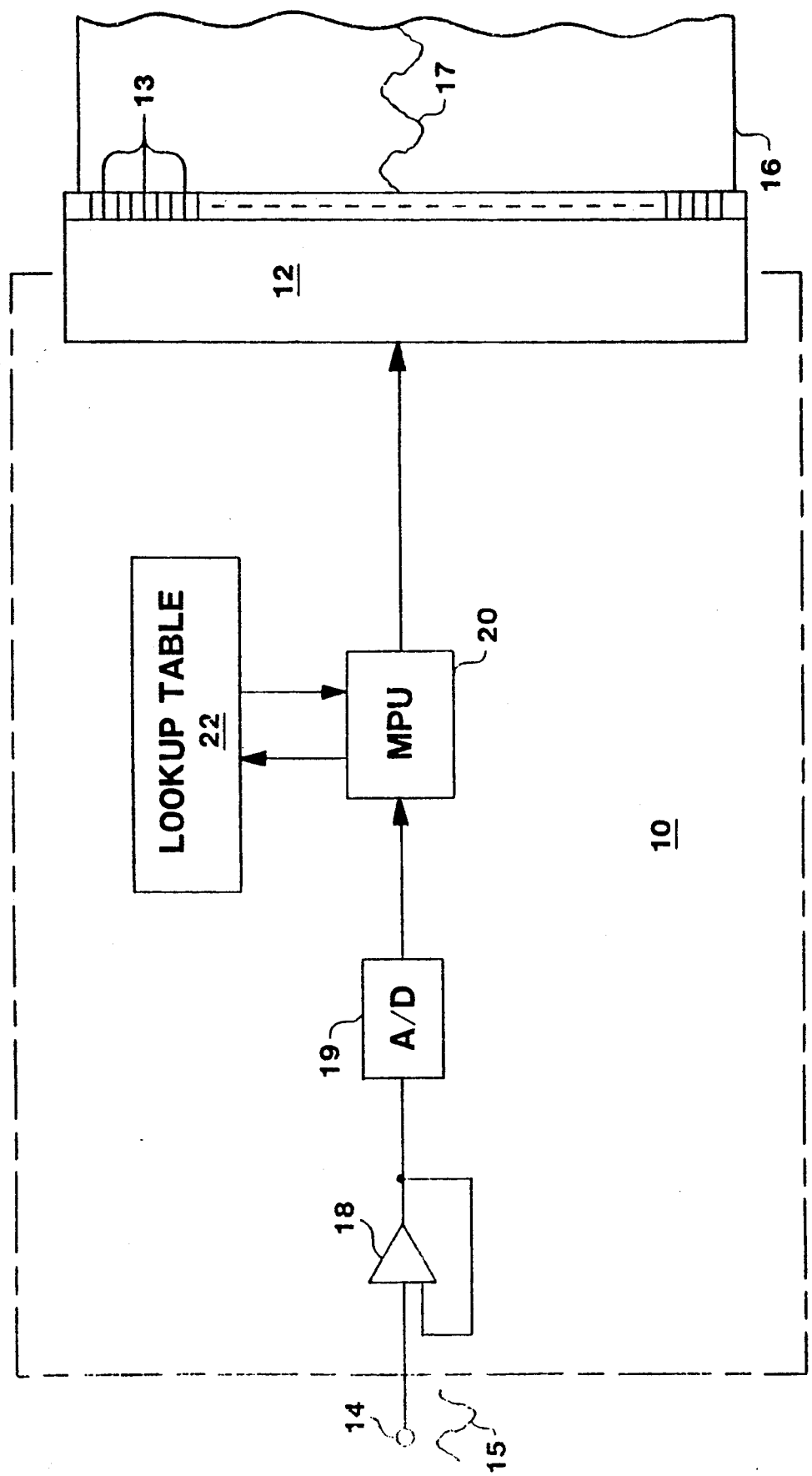
FIG. 1 is a block diagram and diagrammatic view of apparatus pursuant to an embodiment of the invention.

The recording apparatus 10 shown in FIG. 1 has one or more recording heads 12 for recording data with a plurality of clocked recording elements 13 in different scales determined by different data recording parameters. By way of example, FIG. 1 is intended to show that the apparatus has one or more data inputs 14 for receiving one or more signals or data 15 to be recorded by the apparatus 10 on chart paper 16 in the form of one or more traces 17. The usual chart or paper drives and other needed equipment may be used for that purpose, or the invention may be practiced with other similar or entirely different data recorders or printers operating with a plurality of clocked recording elements. Also, the data being recorded may be analog, digital, graphic, numeric, alphanumeric or in any other form that can be handled by the subject invention.

Each data input signal is typically subjected to amplification, such as by a preamplifier 18. In the illustrated preferred embodiment, that preamplifier is connected to an analog-to-digital converter 19. The apparatus 10 includes a micro-processing unit (MPU) 20 which receives the typically analog input data as digital signals to be recorded by the recording head 12.

Figure 2:
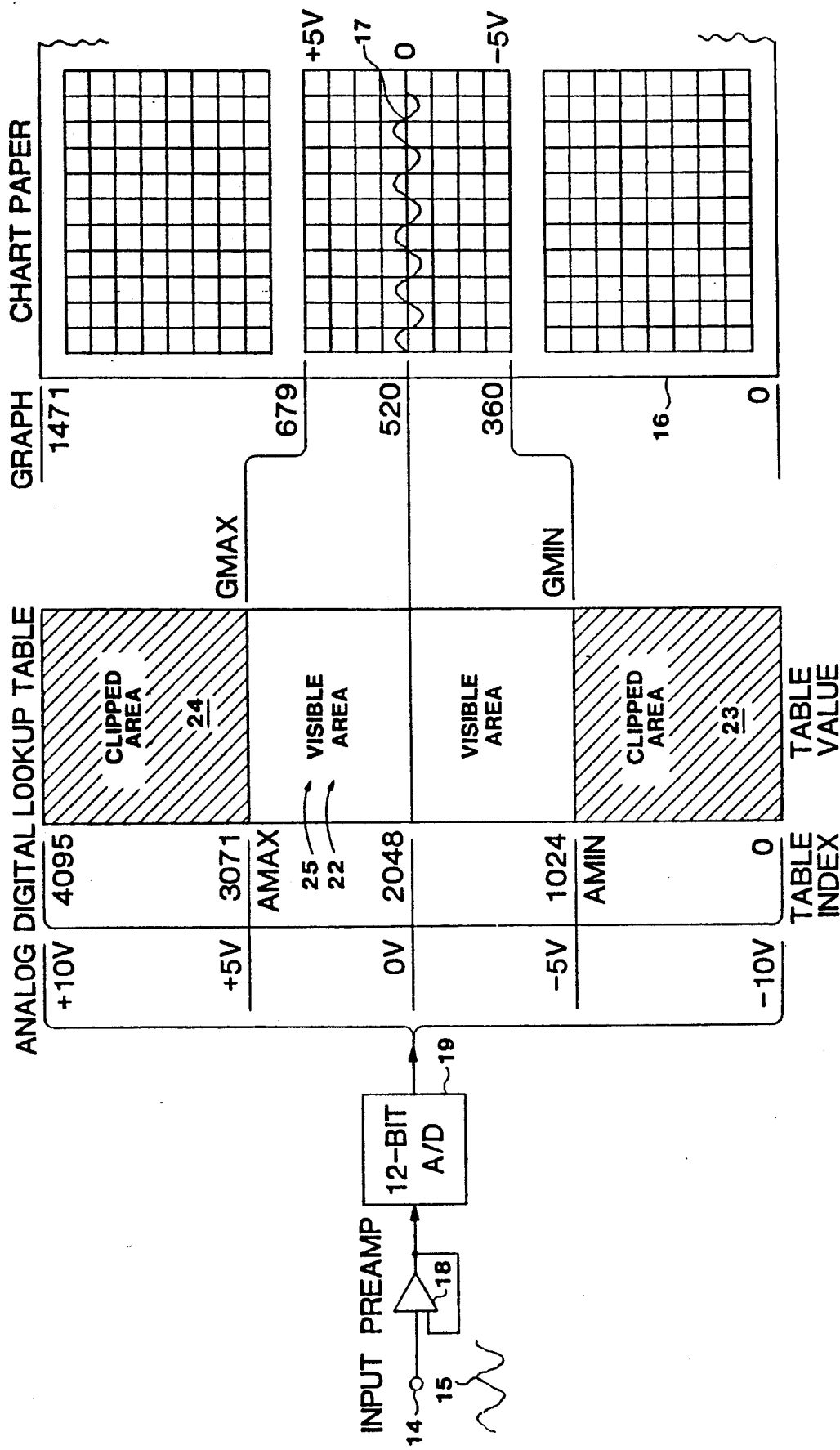
FIG. 2 is a diagrammatic view of a scaling system according to an embodiment of the invention.

By way of example, FIG. 2 shows corresponding analog and digital values. The illustrated analog values run from −10 volts to +10 volts, and the corresponding digital values run from 0 to 4095 for the 4096 digitized levels of the output of the 12-bit A/D converter shown at 19 in FIG. 2, which also shows the above-mentioned input 14, chart 16, trace 17, and preamplifier 18.

FIGS. 1 and 2 show a lookup table 22 for storing recording parameters for addresses for the recording elements 13. In the illustrated embodiment, the lookup table has 4096 index positions in the case of the 12-bit A/D converter 19, while the graphic recorder 10 has a row of 1472 recording elements 13 in one or more recording heads 12. Accordingly, the index positions of the lookup table 22 run from 0 to 4095, while the corresponding addresses of the recording elements 13 run from 0 to 1471.

The apparatus 10 is capable of recording analog signals and other data across the width of the chart paper 16 at full scale. State-of-the-art apparatus in fact are capable of recording signals in different channels simultaneously, and components of such state-of-the-art -apparatus may be employed in the practice of the subject invention as well. Such apparatus more specifically are capable of recording data in different scales determined by different data recording parameters.

The subject invention for this purpose provides an electronic lookup table, such as the illustrated lookup table 22, and electronically fixes for each recording in a different scale the data recording parameters for that scale, as more fully described below. Such electronically fixed data recording parameters are stored in the lookup table 22, and such stored data recording parameters are derived from that lookup table for determining the clocked recording elements for data recording in the particular scale. Data are then recorded with the determined clocked recording elements 13 in that scale, such as shown at 17 in FIG. 2.

By way of example, FIG. 2 shows a scaling down of the number of recording elements between element No. 360 to No. 679, centered about the recording element No. 520, representing zero volts in the illustrated example.

The minimum amplitude (AMIN) of the example given for the embodiment of the invention shown in FIG. 2 is −5 V, and the maximum amplitude (AMAX) is +5 V. As there shown, this corresponds to lookup table indexes 1024 and 3071, among the 4096 lookup table indexes. That, in turn, corresponds to addresses 360 to 679 of the recording elements in the particular example shown in FIG. 2. The resulting scale limits GMIN and GMAX correspond to the minimum and maximum signal amplitudes AMIN and AMAX, respectively.

The corresponding minimum and maximum lookup table indexes are 1024 and 3071 in the example illustrated in FIG. 2. The corresponding lowest and highest addresses of the recording elements 13 used in the particular recording cycle are 360 and 679, respectively, as indicated above.

Other areas 23 and 24 of the lookup table 22 may be unused or clipped during the particular recording cycle, if data is to be recorded only in the central range of the chart paper 16 shown in FIG. 2. The central lookup table area 25 is occupied by the lookup table indexes 1024 to 3071 in the illustrated example.

In this respect, table index 1024 corresponds to GMIN ("graphic minimum"), and table index 3071 corresponds to GMAX shown in FIG. 2.

An equation for determining data recording parameters for a recording cycle may be written as $$\text{table}(n) = GMIN + \frac{(n - AMIN) \times (GMAX - GMIN)}{AMAX - AMIN} \quad (1)$$

wherein:

table(n) is the value or recording element address to be stored at a particular table index, and n is that index.

Figure 3:
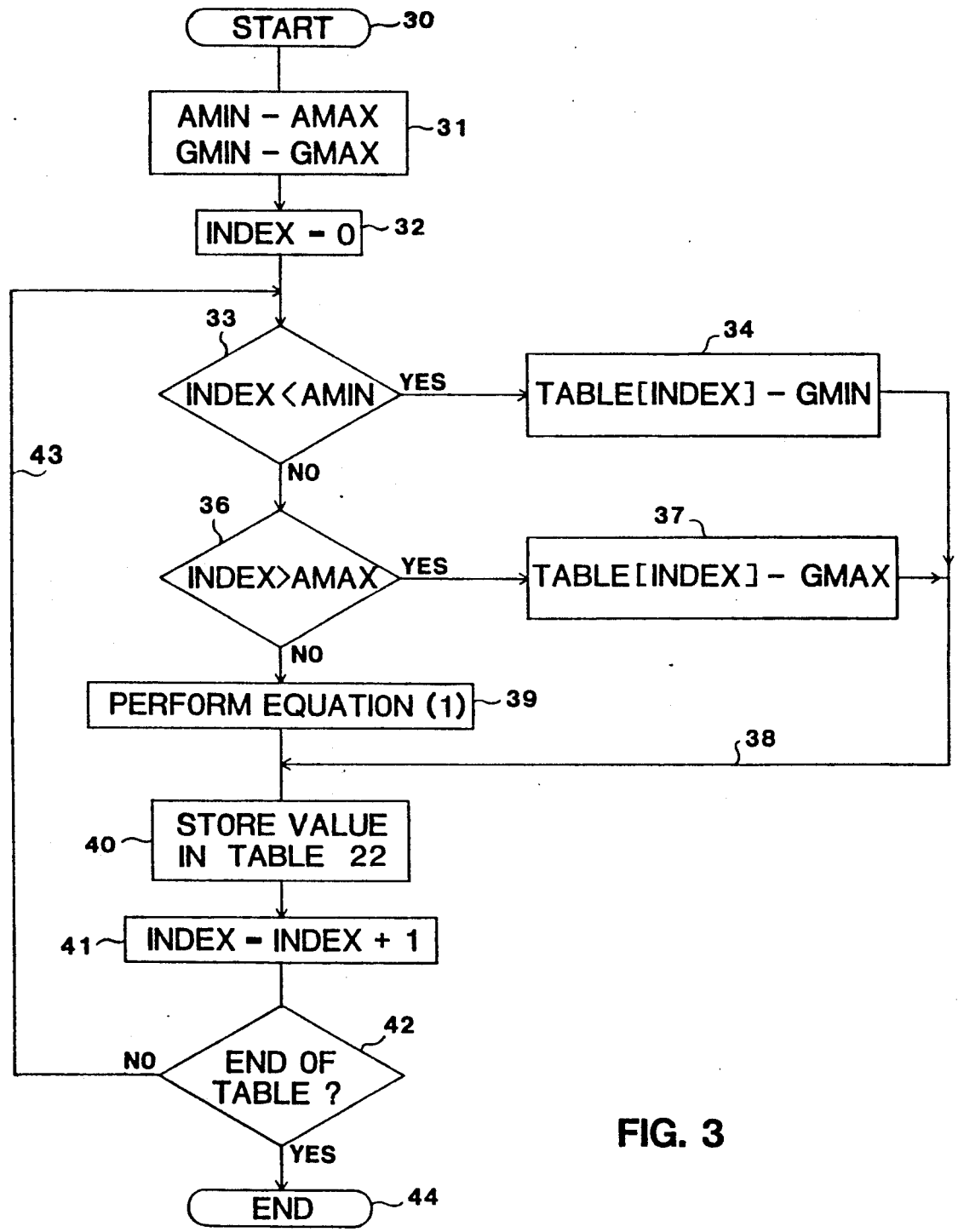
FIG. 3 is a flow sheet of a process according to an embodiment of the invention in conjunction with FIGS. 1, 2, 4, 5 and 6.

The flowchart of FIG. 3 illustrates an application of that equation. The particular equation is for a linear transfer, but the utility of the flowchart extends to the use of other equations for logarithmic or other non-linear transfers.

A calculation according to FIG. 3 starts at entry point 30 and involves block 31 representing the above mentioned parameters AMIN, AMAX, GMIN and GMAX set either by the user or set by the apparatus itself for the particular cycle.

The table value determining process starts at table index 0, as indicated by block 32, and proceeds to the decision block 33 which determines whether the particular index is smaller than AMIN. For indexes below AMIN, the function represented by block 34 and responsive to GMIN blocks out the lookup table area 23 in the example shown in FIG. 2. Conversely, for indexes at and above AMIN, the indexing function proceeds to the decision block 36 which determines whether the particular index is larger than AMAX. For indexes above AMAX, the function represented by the block 37 and responsive to GMAX blocks out the lookup table area 24 in the example shown in FIG. 2. This is further indicated by a line 38.

On the other hand, for indexes at and above AMIN and at or below AMAX, the table value determining function proceeds to the process block 39 which calculates for each table index in the lookup table field 25 the value or recording element address to be stored for the particular printing cycle. The result of each such calculation is stored in the lookup table as indicated by the block 40. The operation proceeds to a block 41 which represents the next higher lookup table index. If that is not the end of the table or of the used portion 25 thereof, a decision block 42 will loop the indexing function via line 43 back to the input of the top decision block 33 for a calculation of the value or recording element address for the next table index position. In this manner, the values or recording element addresses for all the indexing positions necessary for a printout cycle are calculated, and are inserted into the lookup table as data recording parameters.

The end of the requisite calculations for a printing cycle is indicated at 44 in the flowchart of FIG. 3.

Data may thus be recorded in different recording cycles with a plurality of clocked recording elements variably identifiable by different data recording parameters. An embodiment of the subject invention electronically fixes ahead of each different recording cycle the data recording parameters for that cycle and stores such electronically fixed data recording parameters in a lookup table, such as the table 22 in the manner explained by the flowchart of FIG. 3, for example. Such stored data recording parameters are then derived from that lookup table for determining the clocked recording elements or their addresses for data recording in that cycle. The MPU 20 may be employed for that purpose, as schematically indicated in FIG. 1. Within the scope of the subject invention, the lookup table 22 may be filled with the electronically fixed or calculated recording element addresses or data recording parameters while printing is going on, allowing real-time dynamic scaling.

The subject invention may be implemented with standard or conventional components. For instance, the micro-processing unit 20 may use a MOTOROLA Microprocessor of the Type MC68000 as described, for instance, in the MOTOROLA SEMICONDUCTOR Bulletin AD181485, dated March, 1985, or the TOSHIBA TLCS68000 microprocessor. A dynamic random access memory (DRAM) as. lookup table 22 may be combined with that MPU. Examples include the FUJITSU MB 81256 DRAM as seen, for instance, in the FUJITSU Dynamic RAM Products 1990 Data Book, pp. 1-3 to 1-24, and the HITACHI HM50256 Series DRAM as seen, for instance, in the HITACHI IC Memory Data Book #M11.1, pp. 598 to 605.

The subject invention and its embodiments are applicable to many fields. One specific example is automatic calibration of graphic chart recorders using the means and methods herein disclosed. Such automatic system calibration (ASC) allows the operator to calibrate the chart recorder equipment to user-supplied input signals, either DC or AC.

The equipment shown in FIG. 1 and illustrated in FIG. 2 can be provided separately for each channel so that the channels can be calibrated differently from each other.

A channel can be calibrated to two DC level signals for instance. A DC signal of the amplitude of the lowest level required is input to the amplifier 18 and is stored by the microprocessor 20. A DC signal of the amplitude of the highest level to be measured is then input to the amplifier 18 and is also stored by the microprocessor 20 which adjusts the gain of the system so that the amplitude difference between the low and high signal levels is properly positioned on the grid scale. For example, if 1 volt DC was input as the low level and 5 volts DC was input as the high level, the grid on the chart 16 would be calibrated to a 4 volt range full scale, as shown in FIG. 4, which illustrates also print heads 12 and 112 that may be used in FIGS. 1 and 2 for the print elements 13.

Figure 5:
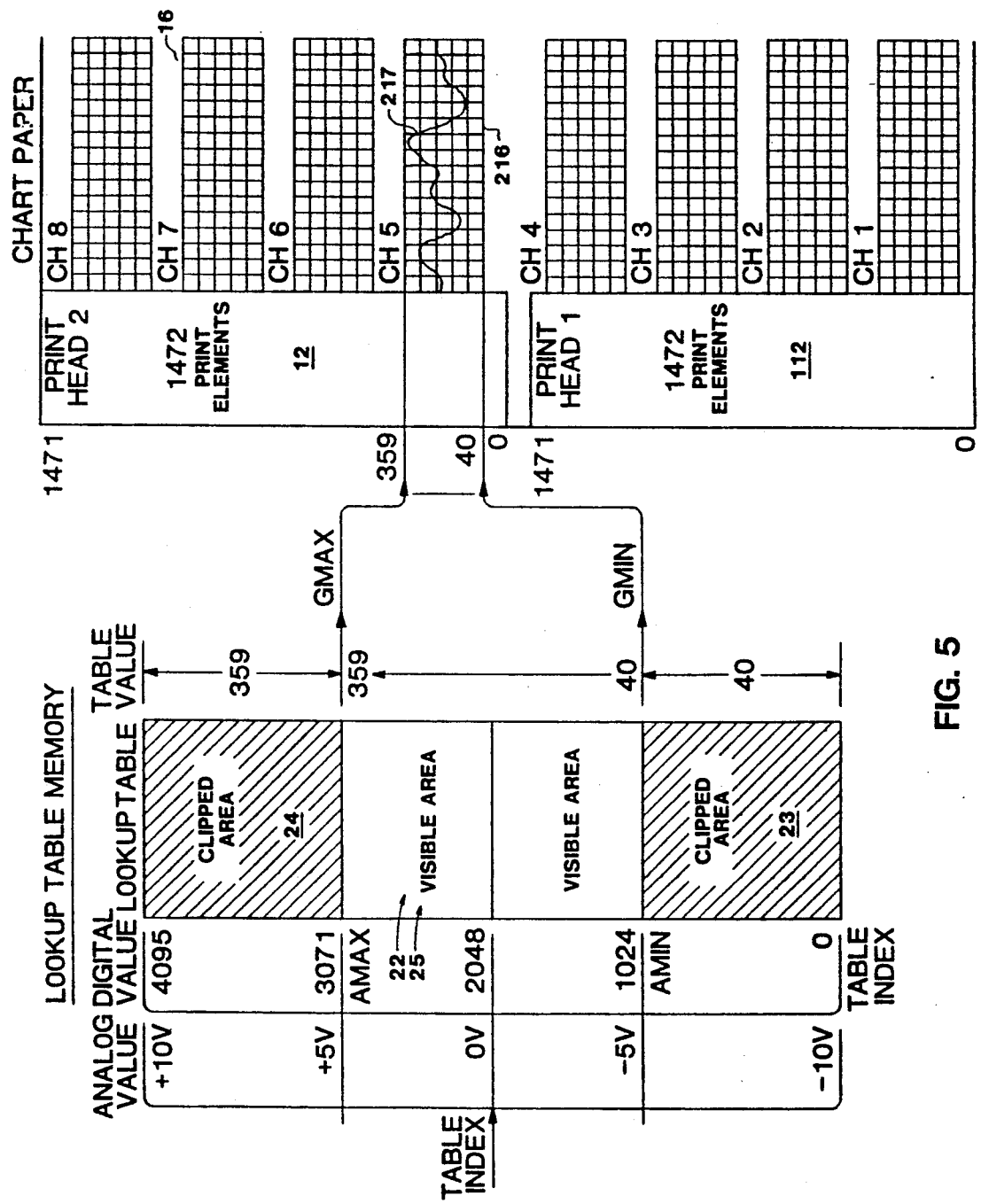
Figure 6:
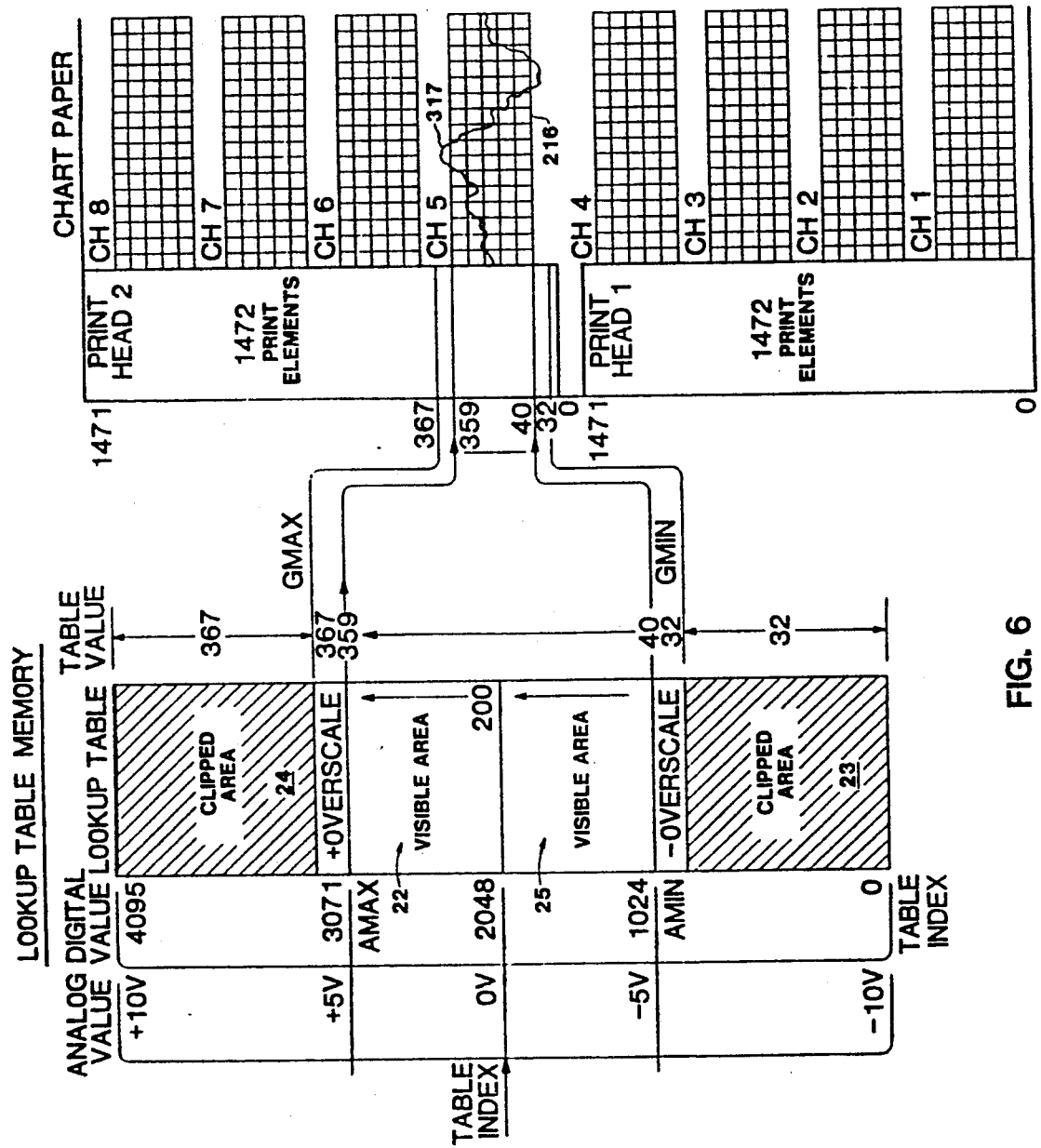

The means and methods disclosed above by reference to FIGS. 1 to 3 may also be used to print the trace 117 between printhead elements Nos. 40 and 359 in one of the channels on the chart paper 16, or to print the traces shown in FIG. 5 and 6 also showing different uses of the lookup table.

Figure 4:
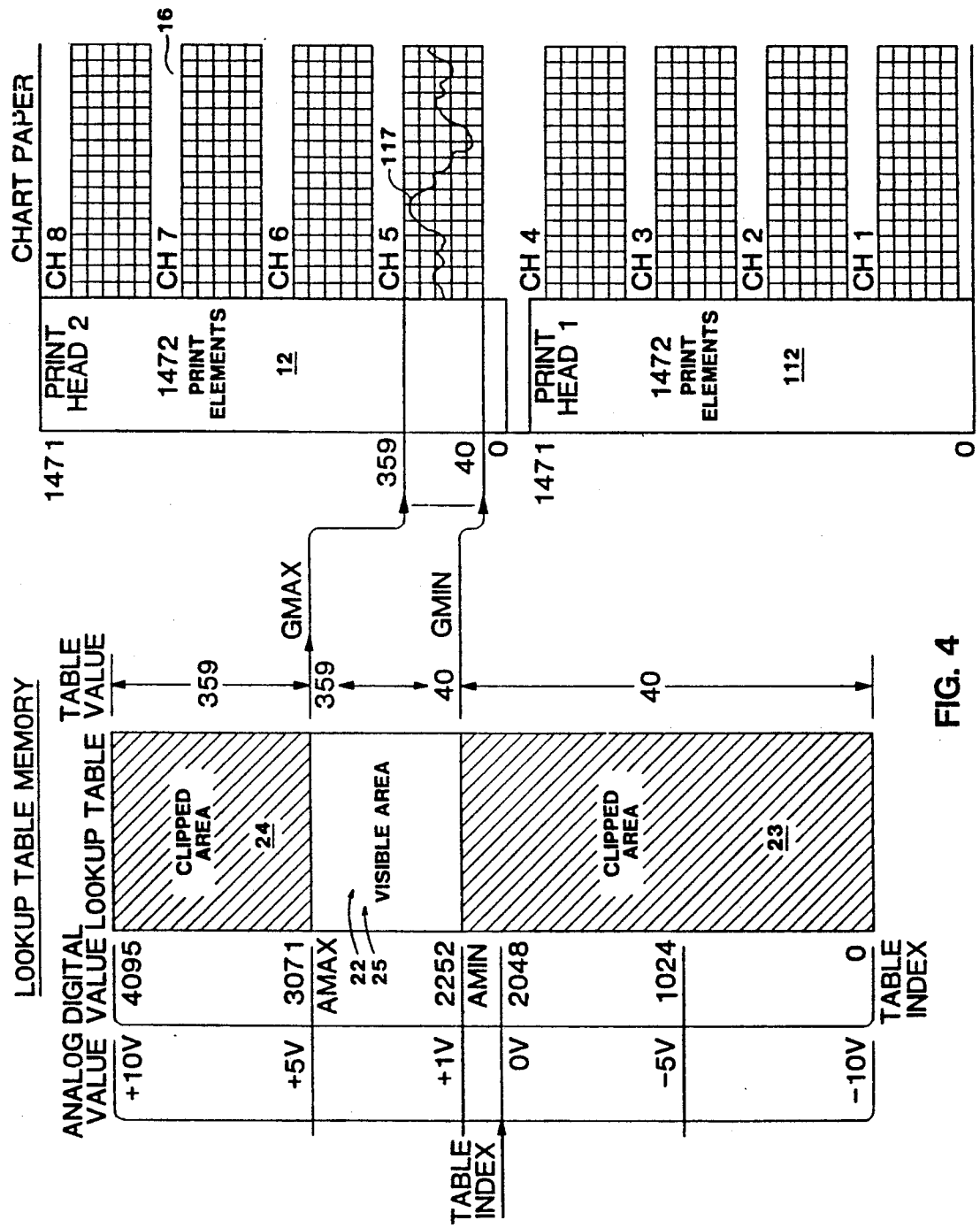
FIGS. 4, 5 and 6 are diagrammatic views of further scaling operations within the scope of the invention.

By way of example, FIG. 4 shows a scaling down of the number of recording elements between element No. 40 to No. 359.

The minimum amplitude (AMIN) of the example given for the embodiment of the invention shown in FIG. 4 is +1 V, and the maximum amplitude (AMAX) is +5 V. As there shown, this corresponds to lookup table indexes 2252 and 3071, among the 4096 lookup table indexes. That, in turn, corresponds to addresses 40 to 359 of the recording elements in the particular example shown in FIG. 4. The resulting scale limits GMIN and GMAX correspond to the minimum and maximum signal amplitudes AMIN and AMAX, respectively.

The corresponding minimum and maximum lookup table indexes are 1024 and 3071 in the example illustrated in FIG. 2. The corresponding lowest and highest addresses of the recording elements 13 used in the particular recording cycle are 360 and 679, respectively, as indicated above.

Other areas 23 and 24 of the lookup table 22 may again be unused or clipped during the particular recording cycle, if data is to be recorded only in the particular channel. The central lookup table area 25 is now occupied by the lookup table indexes 2252 to 3071 in the illustrated example.

In this respect, table index 2252 corresponds to GMIN ("graphic minimum"), and table index 3071 corresponds to GMAX shown in FIG. 4.

The equation (1) may again be used for determining data recording parameters for a recording cycle which may again proceed pursuant to FIG. 3 and as described above.

The same applies to the embodiments shown in FIGS. 5 and 6.

In this respect, it may be noted that FIG. 5 starts out with a ten-volt range from −5 V to +5 V as did FIG. 2. However, the embodiment of FIG. 5 prints the data trace 217 on a different grid scale than the data trace 17 shown in FIG. 2 and also positions the grid 216 differently on the chart paper 16. For this purpose, GMIN is set at 40 while GMAX is set at 359 in FIG. 5 either by the user or by the apparatus 20. As a result of the operation of equation (1) as disclosed with the aid of FIG. 3, the grid pattern 216 and trace 217 are printed between print element Nos. 40 and 359, for instance, rather than between element Nos. 360 and 679 as in FIG. 2.

The embodiment of FIG. 6 expands that range by ±8 print elements 13, thereby permitting positive and negative overscale printing, for instance.

The embodiment of FIG. 6 for simplicity uses the same ten-volt input calibration range and the same AMAX and AMIN as in FIGS. 2 and 5, and prints the scale grid 216 also between print element Nos. 40 and 359, but is, of course, not limited in that manner.

However, the user of or the microprocessor 20 in, the embodiment of FIG. 6 expands the scale limits GMIN and GMAX to print element Nos. 32 and 367 as shown in FIG. 6. Accordingly, operation of equation (1) in conjunction with the procedure disclosed with the aid of FIG. 3 result in deliberate overscale printing as shown at 317 in FIG. 6, Within the scope of the subject invention, the overscale swings may be cut off with the microprocessor 20 and lockup table 22, if not desired. The user may then reset GMIN and GMAX to accommodate the data trace within the grid pattern 216.

More generally speaking it may be noted that the illustrated embodiments set a minimum recording amplitude, AMIN, a maximum recording amplitude, AMAX, a minimum scale limit, GMIN, and a maximum scale limit GMAX for data recording in a first scale or cycle, and effect a fixing of data recording parameters for that first scale or cycle pursuant to such set AMIN, AMAX, GMIN and GMAX, for storing in the lookup table 22. Such fixing of data recording parameters for the first scale may be carried out according to the equation (1) set forth above and the procedure disclosed above with the aid of FIG. 3 may be employed.

The stored data recording parameters for the first scale or cycle are derived from that lookup table and data are recorded with such derived data recording parameters for and in the first scale or cycle.

GMIN and GMAX may be reset for data recording in a second scale or cycle, such as shown in FIGS. 4 and 5. By way of example the fixing of data recording parameters for the second scale or cycle may be effected with the MPU 20 pursuant to the set AMIN, AMAX, and reset GMIN and GMAX. The MPU 20 or apparatus 10 may have or be provided with conventional keys for that purpose. Conventional calibrating voltage sources or techniques may also be employed in the illustrated embodiments.

The MPU stores the data recording parameters for the second scale or cycle in the lookup table 22 and subsequently derives from that lookup table such stored data recording parameters for the second scale or cycle.

Data are then recorded with such derived data recording parameters for and in the second scale or cycle as shown for instance, in FIG. 4 or 5 relative to FIG. 2 or vice versa.

Such resetting and the fixing and storing of data recording parameters for the second scale or cycle may be effected during a recording of data in a first scale or cycle. For instance, if FIG. 2 shows recording in a first scale or cycle, then data recording parameters for the second scale or cycle (e.g. for FIG. 4, 5 or 6) may already be fixed and stored in the lookup table 22 during that recording. Real-time dynamic scaling is thus possible.

The minimum recording amplitude, AMIN, maximum recording amplitude, AMAX, minimum scale limit, GMIN, and maximum scale limit GMAX may all be reset for data recording in a different scale or cycle, and the fixing of data recording parameters for that different scale or cycle may be effected pursuant to such reset AMIN, AMAX, GMIN and GMAX, for recording data with data recording parameters for and in the different scale or cycle after storage in the lookup table 22.

As illustrated in FIG. 6, a minimum recording amplitude, AMIN, and a maximum recording amplitude, AMAX, for data recording in a predetermined scale or cycle, and a minimum scale limit, GMIN, and a maximum scale limit GMAX for overscale recording may be set, such as with the MPU 20. The data recording parameters are fixed for that predetermined scale or cycle pursuant to such set AMIN, AMAX, GMIN and GMAX and for the overscale recording and are stored in the lookup table 22. Such stored data recording parameters for the predetermined scale or cycle and for the overscale recording are derived from that lookup table for recording data with such derived data recording parameters for and in said predetermined scale or cycle with overscale recording as shown, for instance, in FIG. 6, showing recording beyond the scale set by AMIN and AMAX.

The subject extensive disclosure will render apparent or suggest to those skilled in the art various modifications and variations within the spirit and scope of the subject invention and equivalents thereof.

We claim:

1. In a method of recording data with a plurality of clocked recording elements in a plurality of recordings in a plurality of different scales determined by different data recording parameters,
   the improvement comprising in combination the steps of:
   providing an electronic lookup table;
   setting a minimum recording amplitude, AMIN, a maximum recording amplitude, AMAX, a minimum scale limit, GMIN, and a maximum scale limit GMAX for data recording in a first scale;
   electronically fixing the data recording parameters for said first scale pursuant to said set AMIN, AMAX, GMIN and GMAX and according to the equation $$\text{table}(n) = GMIN + \frac{(n - AMIN) \times (GMAX - GMIN)}{AMAX - AMIN} \quad (1)$$

wherein
   table(n) is a recording element address to be stored at a particular table index of said lookup table, and n is that index;
   storing said electronically fixed data recording parameters in said lookup table for said first scale;
   deriving said fixed stored data recording parameters from said lookup table for said first scale for determining the clocked recording elements for data recording in said first scale; and recording data with said determined clocked recording elements in said first scale.

2. A method as in claim 1, including the steps of:
resetting GMIN and GMAX for data recording in a second scale;
effecting the fixing of data recording parameters for said second scale pursuant to said set AMIN, AMAX, and said reset GMIN and GMAX;
effecting said storing by storing in said lookup table said fixed data recording parameters for said second scale;
deriving from said lookup table said fixed stored data recording parameters for said second scale; and
recording data with said derived fixed data recording parameters for and in said second scale.

3. A method as in claim 2, wherein:
said resetting of GMIN and GMAX and said fixing and said storing of fixed data recording parameters for said second scale are effected during said recording of data in said first scale.

4. A method as in claim 1, including the steps of:
resetting the minimum recording amplitude, AMIN, maximum recording amplitude, AMAX, minimum scale limit, GMIN, and maximum scale limit GMAX for data recording in a different scale;
effecting said fixing of data recording parameters for said different scale pursuant to said reset AMIN, AMAX, GMIN and GMAX;
effecting said storing by storing in said lookup table said fixed data recording parameters for said different scale;
deriving from said lookup table said fixed stored data recording parameters for said different scale; and
recording data with said derived fixed data recording parameters for and in said different scale.

5. A method as in claim 1, including the steps of:
setting a minimum recording amplitude, AMIN, and a maximum recording amplitude, AMAX, for data recording in a predetermined scale, and a minimum scale limit, GMIN, and a maximum scale limit GMAX for recording beyond said scale;
effecting said fixing of data recording parameters for said predetermined scale pursuant to said set AMIN, AMAX, GMIN and GMAX and for said recording beyond said scale;
effecting said storing by storing in said lookup table said data recording parameters for said predetermined scale and for said recording beyond said scale;
deriving from said lookup table said stored data recording parameters for said predetermined scale and for said recording beyond said scale; and
recording data with said derived fixed data recording parameters for and in said predetermined scale and beyond said scale.

6. In a method of recording data with a plurality of clocked recording elements in a plurality of recordings in a plurality of different scales determined by different data recording parameters,
the improvement comprising in combination the steps of:
providing an electronic lookup table;
electronically fixing for each recording in a different scale said data recording parameters for that scale for storing in said lookup table according to the equation $$\text{table}(n) = GMIN + \frac{(n - AMIN) \times (GMAX - GMIN)}{AMAX - AMIN} \quad (1)$$

wherein
table(n) is a recording element address to be stored at a particular table index of said lookup table, and n is that index,
AMIN is a minimum recording amplitude and
AMAX is a maximum recording amplitude set for said recording, and
GMIN is a minimum scale limit and GMAX is a maximum scale limit for said recording; and
storing these fixed data recording parameters in said lookup table for said determining of clocked recording elements for data recording;
deriving said fixed stored data recording parameters from said lookup table for determining the clocked recording elements for data recording in said scale; and
recording data with said determined clocked recording elements in said scale.

7. In a method of recording data in a plurality of recordings in a plurality of different recording cycles with a plurality of clocked recording elements variably identifiable by different data recording parameters,
the improvement comprising in combination the steps of:
providing an electronic lookup table;
setting a minimum recording amplitude, AMIN, a maximum recording amplitude, AMAX, a minimum scale limit, GMIN, and a maximum scale limit GMAX for data recording in a first cycle;
electronically fixing the data recording parameters for said first cycle pursuant to said set AMIN, AMAX, GMIN and GMAX and according to the equation $$\text{table}(n) = GMIN + \frac{(n - AMIN) \times (GMAX - GMIN)}{AMAX - AMIN} \quad (1)$$

wherein
table(n) is a recording element address to be stored at a particular table index of said lookup table, and n is that index;
storing said electronically fixed data recording parameters in said lookup table for said first cycle;
deriving said fixed stored data recording parameters from said lookup table for said first cycle for determining the clocked recording elements for data recording in said first cycle; and
recording data with said determined clocked recording elements in said first cycle.

8. A method as in claim 7, including the steps of:
resetting GMIN and GMAX for data recording in a second cycle;
effecting the fixing of data recording parameters for said second cycle pursuant to said set AMIN, AMAX, and said reset GMIN and GMAX;
effecting said storing by storing in said lookup table said fixed data recording parameters for said second cycle;
deriving from said lookup table said fixed stored data recording parameters for said second cycle; and
recording data with said derived fixed data recording parameters for and in said second cycle.

9. A method as in claim 8, wherein:

said resetting of GMIN and GMAX and said fixing and said storing of data recording parameters for said second cycle are effected during said recording of said fixed data in said first cycle.

10. A method as in claim 7, including the steps of:

resetting the minimum recording amplitude, AMIN, maximum recording amplitude, AMAX, minimum scale limit, GMIN, and maximum scale limit GMAX for data recording in a different cycle;

effecting said fixing of data recording parameters for said different cycle pursuant to said reset AMIN, AMAX, GMIN and GMAX;

effecting said storing by storing in said lookup table said fixed data recording parameters for said different cycle;

deriving from said lookup table said fixed stored data recording parameters for said different cycle; and recording data with said derived fixed data recording parameters for and in said different cycle.

11. A method as in claim 7, including the steps of:

setting a minimum recording amplitude, AMIN, and a maximum recording amplitude, AMAX, for data recording in a predetermined scale, and a minimum scale limit, GMIN, and a maximum scale limit GMAX for recording beyond said scale;

effecting said fixing of data recording parameters for said predetermined scale pursuant to said set AMIN, AMAX, GMIN and GMAX and for said recording beyond said scale;

effecting said storing by storing in said lookup table said fixed data recording parameters for said predetermined scale and for said recording beyond said scale;

deriving from said lookup table said fixed stored data recording parameters for said predetermined scale and for said recording beyond said scale; and recording data with said derived fixed data recording parameters for and in said predetermined scale and beyond said scale.

12. In a method of recording data in a plurality of recordings in a plurality of different recording cycles with a plurality of clocked recording elements variably identifiable by different data recording parameters, the improvement comprising in combination the steps of:

providing an electronic lookup table;

electronically fixing for each different recording cycle said data recording parameters for that cycle for storage in said lookup table according to the equation $$\text{table}(n) = GMIN + \frac{(n - AMIN) \times (GMAX - GMIN)}{AMAX - AMIN} \quad (1)$$

wherein:

table(n) is a recording element address to be stored at a particular table index of said lookup table, AMIN is a minimum recording amplitude and AMAX is a maximum recording amplitude set for a recording cycle, and GMIN is a minimum scale limit and GMAX is a maximum scale limit for a recording cycle; and storing these fixed data recording parameters in said lookup table for said determining of clocked recording elements for the particular recording cycle;

deriving said fixed stored data recording parameters from said lookup table for determining the clocked recording elements for data recording in said cycle; and recording data with said determined clocked recording elements in said cycle.

* * * * *